United States Patent
Molnar et al.

(10) Patent No.: US 6,684,071 B1
(45) Date of Patent: *Jan. 27, 2004

(54) TERMINAL POSITION LOCATION USING MULTIPLE BEAMS

(75) Inventors: Karl J. Molnar, Cary, NC (US); Paul W. Dent, Stehags (SE)

(73) Assignee: Ericsson Inc., Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/597,073

(22) Filed: Feb. 5, 1996

Related U.S. Application Data

(63) Continuation-in-part of application No. 08/179,958, filed on Jan. 11, 1994, now abandoned, and a continuation-in-part of application No. 08/179,953, filed on Jan. 11, 1994, now Pat. No. 5,619,503.

(51) Int. Cl.[7] ................................................. H04Q 7/20
(52) U.S. Cl. ....................................................... 455/429
(58) Field of Search ................................. 455/429, 456; 340/825.21, 825.49; 342/357

(56) References Cited

U.S. PATENT DOCUMENTS

| | | | | |
|---|---|---|---|---|
| 4,613,990 A | * | 9/1986 | Halpern ........................ | 455/33 |
| 5,073,900 A | | 12/1991 | Mallinckrodt ................... | 375/1 |
| 5,119,504 A | | 6/1992 | Durboraw, III ............. | 455/54.1 |
| 5,161,248 A | | 11/1992 | Bertiger et al. ................ | 455/17 |
| 5,339,330 A | * | 8/1994 | Mallinckrodt | |
| 5,551,058 A | * | 8/1996 | Hutcheson et al. .......... | 455/429 |
| 5,551,059 A | * | 8/1996 | Hutcheson et al. .......... | 455/429 |
| 5,552,798 A | * | 9/1996 | Dietrich et al. .............. | 343/893 |
| 5,619,525 A | * | 4/1997 | Wiedeman et al. .......... | 375/200 |
| 5,905,443 A | * | 5/1999 | Olds et al. ............. | 340/825.21 |
| 5,907,809 A | * | 5/1999 | Molnar et al. ............... | 455/456 |

FOREIGN PATENT DOCUMENTS

| | | |
|---|---|---|
| DE | 4321909 | 3/1995 |
| EP | 0698972 | 2/1996 |
| EP | 0748065 | 12/1996 |
| WO | WO96/21332 | 7/1996 |

OTHER PUBLICATIONS

"An Azimuthal Omni–Directional Array for Multi–Target Acquisition and Tracking", Filipovic, Daniel F., et al., IEEE Antennas and Propagation Society International Symposium, Chicago, Jul. 20–24, 1992, vol. 1, pp. 637–640.

* cited by examiner

*Primary Examiner*—William Cumming
(74) *Attorney, Agent, or Firm*—Myers Bigel Sibley & Sajovec

(57) ABSTRACT

Exemplary embodiments of the present invention describe terminal position location methods and systems. Relative powers of nearby spot beams which are generated by array antennas are determined. For example, powers from six neighboring spot beams relative to a center spot beam within which a mobile station is currently operating, can be measured relative to the power of the center spot beam. Using information from these measurements, the mobile stations position can be determined using, for example, an exponential model of the spot beam pattern.

28 Claims, 10 Drawing Sheets

TERMINAL POSITION LOCATION USING MULTIPLE BEAMS

RELATED APPLICATIONS

This application is a continuation-in-part of U.S. patent application Ser. No. 08/179,958 entitled "Position Registration for Cellular Satellite Communication Systems", filed on Jan. 11, 1994, now abandoned and is a continuation-in-part of U.S. application Ser. No. 08/179,953, entitled "A Cellular/Satellite Communications System with Improved Frequency Re-Use", which application was also filed on Jan. 11, 1994, now U.S. Pat. No. 5,619,503. Both of the aforementioned disclosures are incorporated here by reference.

BACKGROUND

The present invention relates to a system for locating terminals in a radio communication system and, more particularly, to the location of terminals in radio communication systems wherein spot beams are used to irradiate geographical regions to provide communication coverage.

One example of radio communication systems employing spot beams can be found in satellite communication systems. Another example is cellular/PCS systems which use fixed-beam phased arrays. To achieve an economically useful capacity to serve a large number of subscribers, communication systems need to allow reuse of the available spectrum many times over the globe. This can be achieved, for example, by the use of multiple spot beam antennas that divide the illumination of the chosen service area between many smaller regions.

The most promising satellite systems for such applications are those which place satellites in a low earth orbit (LEOs), in a medium earth orbit (MEOs) or in a stationary earth orbit (GEOs). Disadvantages of satellites in stationary orbits include the huge antennas that are needed to create the desired size spot beams from the 40,000 km orbit distance and the long delay in signals traversing the orbit distance which creates a problem for two-way conversations. On the other hand, the disadvantage of satellites in low earth orbits is that the satellites move relative to the earth and thus the areas that the spot beams illuminate change as the satellites circle the earth. Medium earth orbiting satellites exhibit the problems of both LEOs and GEOs, although to a lesser degree.

Satellite systems employing low or medium earth orbit satellites need to compensate for the rapidly changing propagation delay in the links between the satellites and terminals on the earth caused by the satellites' movement relative to the earth. During communication in such systems, Doppler compensation is provided to the signals to account for the change in propagation delay. In order to provide Doppler compensation, the terminal can search for the Doppler frequency which is an exhaustive and time consuming process that delays connection to the system. Alternatively, however, given knowledge of the terminal's location, as well as satellite ephemerides information, a Doppler compensation can be calculated instead of searching for the Doppler frequency, thereby speeding up the process of call origination.

Knowledge of the terminal unit's position can also be useful in the provision of many other system functions. For example, handover of a terminal unit between spot beams and channel assignment can be facilitated using knowledge of the terminal's position. Moreover, as described in the above-identified U.S. patent application Ser. No. 08/179,953, terminal position is also useful in computing the beamforming matrix.

A conventional method for determining a terminal's location is to use information derived from the Global Positioning System (GPS). The GPS includes a number of MEO satellites, each of which transmits a known signal. From any given point on earth, a terminal can receive and measure three or four such signals (because of the large number of GPS satellites in orbit) to determine a time delay and hence a distance between the three or four satellites and the terminal. This information can then be used to triangulate on the terminal's position. Although this technique is reasonably effective in a system in which many different satellites' signals are available to a receiver, other systems, such as GEO satellite systems, do not have this luxury. Accordingly, it would be desirable to provide different methods and systems for obtaining position information for terminals in radiocommunication systems which do not rely on the availability of signals from multiple satellites.

SUMMARY

According to exemplary embodiments of the present invention, terminal location is accomplished by measuring relative signal strength values of signals received from a plurality of spot beams closest to the terminal. For example, signal strengths from six neighboring spot beams, relative to a center spot beam within which a mobile station is currently operating, can be measured relative to the strength of the center spot beam. Using information from these measurements, the terminal's position can be determined using an exponential model of the spot beam pattern. These exemplary techniques can be applied to any radio communication system using array antennas that have multiple beams including systems having satellite or land-based base stations.

According to other exemplary embodiments, the mobile station or terminal can measure the time delay of signals propagating from a satellite and use the information from several such measurements to determine its location. This procedure can be performed, for example, during call set-up or during wake-up periods when the mobile is looking for paging messages.

BRIEF DESCRIPTION OF THE DRAWINGS

These and other features and advantages of the present invention will be readily apparent to one skilled in the art from the following written description, used in conjunction with the drawings, in which.

DETAILED DESCRIPTION

Figure 1:
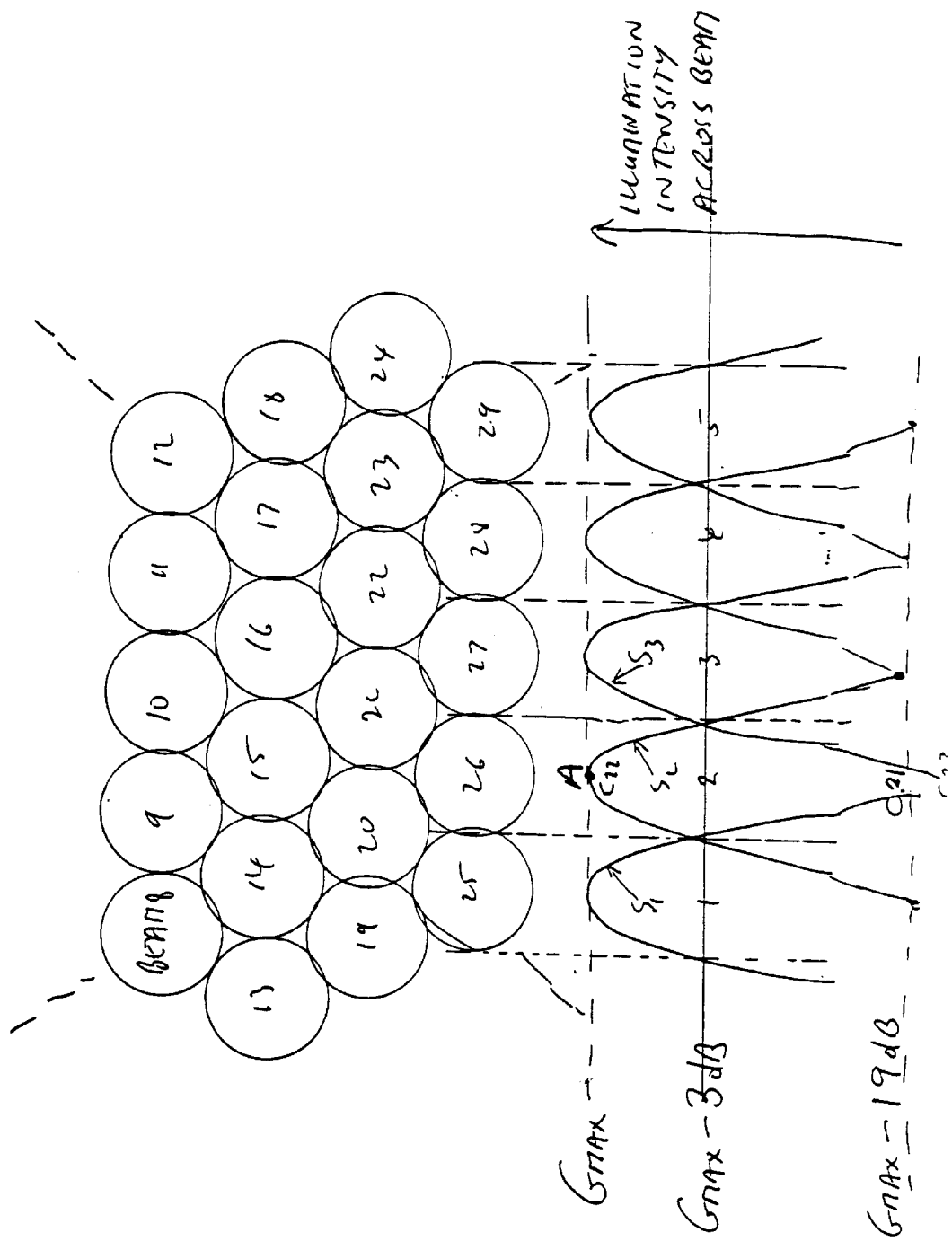
FIG. 1 illustrates an exemplary spot beam illumination pattern.

To begin this discussion of terminal position determination, consider a greatly simplified satellite communication system wherein three communication channels are available. A number of antenna beams, for example 37, could be provided as determined by the fixed physical characteristics of a satellite antenna system, and used to illuminate the earth in so-called spot beam coverage regions. Some of these 37 spot beams are illustrated in FIG. 1. According to conventional wisdom, the gain at the worst point, which lies midway between three spots (e.g., those indicated as corresponding to the beam illumination crossover points in FIG. 1), is maximized by choosing the beam width such that the gain is approximately 3 dB down at the midway point relative to the peak, beam-center gain. This is one exemplary compromise which can be implemented between, on the one hand, reducing the peak gain by broadening the beam so as to reduce the edge loss and, on the other hand, narrowing the beam to increase the peak gain but then suffering a greater beam edge loss the same distance off-center as before. An alternative is disclosed in the aforementioned U.S. patent application Ser. No. 08/179,583 which describes how channels can advantageously be radiated in slightly different directions so that each point on earth is near a beam center of one channel. In this way the system can be provided with a number of channels from which to choose that are more centrally toward any particular mobile, thus avoiding the beam-edge loss that would otherwise occur.

In either case, a system could employ all of the three frequency channels in every one of the 37 spot beams, with the consequence that a mobile at the midway point between three beams would receive equal overlapping signals on each frequency from all three beams, i.e., two, equal-strength interferers on top of each wanted signal, or this interference problem could be avoided by distributing the frequencies between beams in a 3-cell frequency re-use pattern. In the latter case a mobile at the midway point between three beams would receive all three frequencies at equal strength from the three different surrounding beams, but one frequency only from each beam, with somewhat reduced interference from sidelobes of beams which are further away. A mobile at the midpoint between two beams would receive equal signal strength on two frequencies and somewhat reduced signal strength from two equal signals on the third frequency. A mobile at the center of a beam would receive principally the frequency of that beam with somewhat reduced signal strength on the other two frequencies from the six surrounding beams. Thus, it is possible for a mobile station to roughly determine its position based on the relative received signal strength, e.g., on the three frequencies, as described in more detail the afore-incorporated by reference U.S. patent application Ser. No. 08/179,958. The following describes a more detailed, exemplary method for determining location based upon signal strengths received from nearby beams.

The power received by a mobile from each beam depends upon the magnitude of the beam-shape, and the resulting radiation pattern of the beam is determined from a combination of the individual element radiation pattern and the array factor due to beam-forming of the elements. One model that can be used for determining the resulting pattern power loss is an exponential model. If there is enough discrimination from one beam to the next, then the received signal strength measured from the occupied and surrounding beams can be used as measurements of the beam-shape, which can be used to determine the mobile position.

Figure 2:
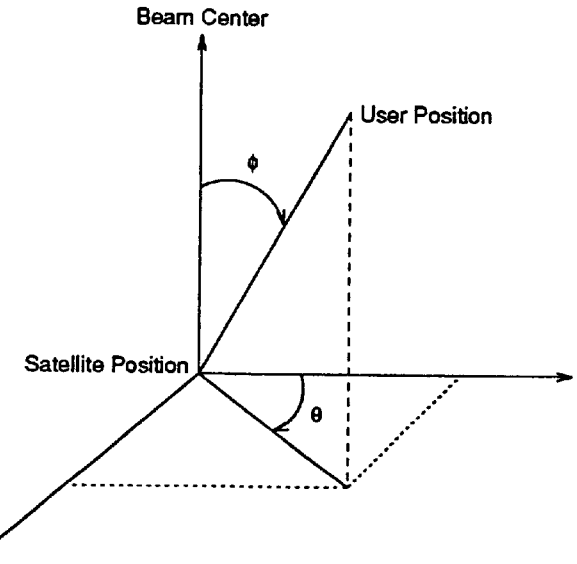
FIG. 2 illustrates exemplary coordinate axes and angles used to identify a terminal position relative to a satellite position.

When the position of the center of the beam is assumed to be known, the problem of estimating the mobile position becomes one of estimating the user position relative to the beam center. Given the known pointing direction of a particular spot beam, the user position can be specified by two angular quantities: the angle away from the beam center angle, $\phi$; and the angle about the ray that extends from the satellite in the direction of the center of the beam, $\theta$. This concept is illustrated in FIG. 2.

Figure 3:
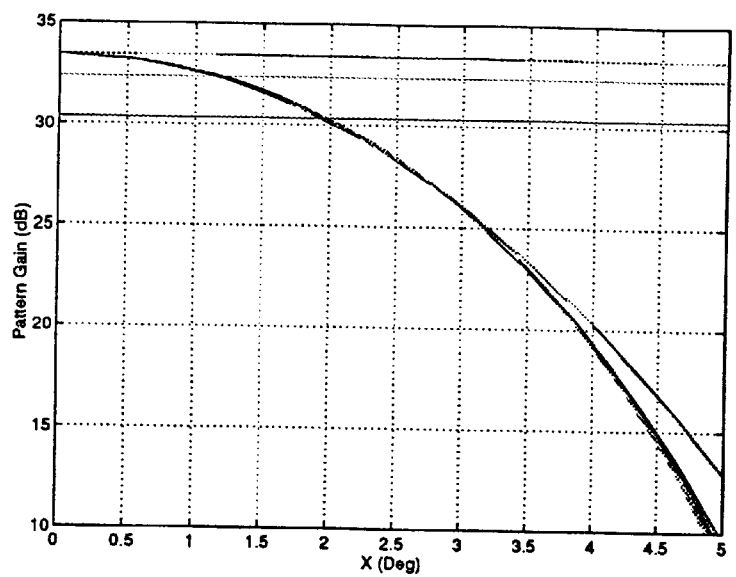
FIG. 3 is a graph illustrating the relative accuracy of exponential beam shape modeling as a function of the angle away from the beam center.

The beam pattern is a function of both the angles $\phi$ and $\theta$, although the normalized beam shape can be modelled using the exponential equation given by:

$$p(\phi) = e^{-\alpha \phi^2}, \tag{1}$$

where $\alpha$ is chosen to fit the model to the true beam pattern. This model is relatively accurate for small values of $\phi$, usually up to a few degrees. For example, in a 211 element array proposal for the Inmarsat EP21 satellite design, the value of alpha found to approximate the array pattern after beam-forming is 0.1891. A plot of the simulated beam-formed pattern for this system compared with the exponentially modeled pattern is shown in FIG. 3. Therein the modeled pattern is represented by the divergent curve which has higher (y-axis) pattern gain values. It is seen that the exponential model fit is relatively accurate up to about $\phi=3$ degrees where it diverges from the simulated pattern.

In order to illustrate position determination of the mobile according to an exemplary embodiment of the present invention, a number of simplifying assumptions have been made as listed below.

The satellite position is assumed to be known, for example, from ephemeris data which is transmitted to or stored in the mobile.

The techniques described herein are intended to determine mobile position in a short period of time, e.g., a few seconds. Thus, the satellite position can be considered stationary. If longer times are used to determine position, then tracking of the satellite position can be incorporated into these techniques, or the ephemeris data available to the mobile could be used.

The scan loss over the set of beams used to determine the mobile position is considered to be minimal. Scan loss is due to the satellite pointing a beam away from nadir (i.e., large values of $\phi$), and can also be modeled as an exponential loss. If this loss is significant, then it can be accounted for in the following model equations or by knowledge of the satellite and beam positions.

Figure 4:
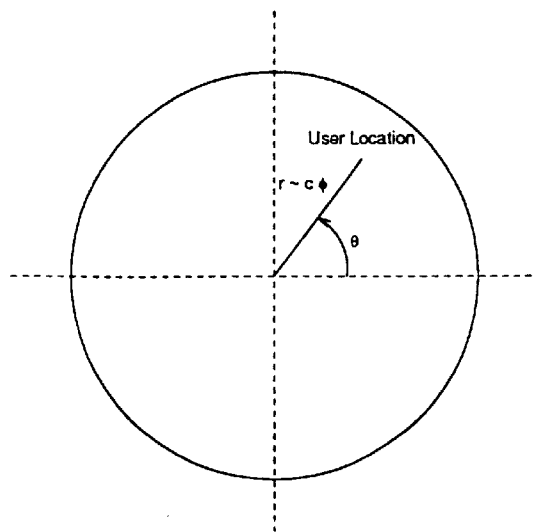
FIG. 4 is a graph which illustrates radial mapping of terminal location.

For each beam there is a mapping from the coordinates ($\phi$, $\theta$) to a specific location on the earth. It is assumed that this is a radial mapping and takes the form $r=c\phi$, where c is different for each beam, and that $\theta$ gives the angular position of the user from the center of the beam. This mapping is shown in FIG. 4. Other expressions for this model that include non-circular mappings can be formulated to approximate the exact beam-shape as will be appreciated by those skilled in the art.

The beam that the mobile user resides in and the six surrounding beams are used for determining the mobile position in the following exemplary embodiment. This assumes that the frequency plan uses a seven cell reuse pattern, and that the mobile measures the signal power from channels in each of these different beams. These measurements can be taken either simultaneously or, more practically, at different times. Of course, the present invention can be adapted to any cell reuse pattern desired.

In order to estimate the values $\phi$ and $\theta$, the mapping $x=f(\phi,\theta)$ is used (note that vector quantities are represented by bold typeface) and is given by:

$$x = \begin{bmatrix} x(\phi, \theta) \\ y(\phi, \theta) \end{bmatrix} \quad (2)$$

$$= \begin{bmatrix} c\phi\sin(\theta) \\ c\phi\sin(\theta) \end{bmatrix}, \quad (3)$$

where theta is measured from the beam center. Now, to estimate the mobile position, power measurements are taken from signals in the current and six surrounding beams. The power measurements are denoted as $p=[p_0,p_1,p_2,\ldots,p_6]^T$. The model for the measurements from the i'th beam becomes:

$$p_i(x) = Ae^{-\alpha((x-x_i)^2+(y-y_i)^2)} \quad (4)$$

$$= Ae^{-\alpha|x-x_i|^2}, \quad (5)$$

where $i \in \{0,1,\ldots,6\}$ denotes the beam that the measurement is taken from and $x_i$ denotes the location of the center of beam i. Using this model directly to determine mobile position poses a problem, since the absolute power (represented by the scaling factor A in equations (4) and (5)) of the signal may not be known. Thus, according to exemplary embodiments of the present invention, relative measurements of the power from pairs of beams can be used to determine location. For example, the center beam can be used as a reference with respect to which relative power measurements can be determined. These measurements are denoted as $y=[h_1,\ldots,h_6]^T$, where $h_i=p_i/p_0$. Using this approach, the measurement and model becomes:

$$h_i(x) = e^{-\alpha((x-x_i)^2+(y-y_i)^2)} \cdot e^{\alpha((x-x_0)^2+(y-y_0)^2)} \quad (6)$$

$$= e^{-\alpha(|x-x_i|^2-|x-x_0|^2)} \quad (7)$$

For example, $h_i(x)$ can be calculated by mobile stations using the RSSI of received time slots from each of the six surrounding beams relative to a time slot received from the center beam, which measurements would then be used in equations (6) and (7). Now, with the measurement model described in equations (6) and (7) above, the estimates of the mobile position can be determined. To estimate the mobile position, the Kalman minimum variance least-squares estimate of x is calculated by finding the point that minimizes the equation $J(x)$ given by:

$$J(x)=(x-\hat{x}_{k|k-1})^T P_{x,k|k-1}^{-1}(x-\hat{x}_{k|k-1})+(y-h(x))^T R_y^{-1}(y-h(x)), \quad (8)$$

where $\hat{x}_{k|k-1}$ is the estimate of the mobile position, $P_{x,k|k-1}$ is an estimate of the position covariance matrix, and $R_y$ is the assumed known measurement variance. Initial values are chosen for both $\hat{x}_{k|k-1}$ and $P_{x,k|k-1}$. For example, the beam center position can be chosen for $\hat{x}_{k|k-1}$, and for $P_{x,k|k-1}$ the radius of the beam is used as the standard deviation of the initial estimate. For the value of $R_y$, the assumed noise variance is chosen by assuming the worst-case signal to noise values that the technique is supposed to handle, and then choosing the appropriate noise variance of the power measurement corresponding to this signal to noise value. The noise from different beams is assumed to be independent. The function h(x) is given by the equation:

$$h(x) = \begin{bmatrix} h_1(x) \\ h_2(x) \\ \vdots \\ h_6(x) \end{bmatrix}, \quad (9)$$

Using this form for the position estimator allows the mobile position to be tracked over time and also produces an estimate of the estimator covariance. The covariance can be useful if the measured power noise variance is also estimated, in which case the estimator covariance can give better information about the accuracy of the estimated results. For example, this covariance provides an indication of the reliability of the position estimate which can be used to more accurately predict beam handover times.

Finding the minimum point for $J(x)$ can be accomplished in a number of different ways. Since the function h(x) is highly non-linear, an extended Kalman filtering approach can be used. Also, because of the non-linearities, the iterated extended Kalman filter approach is preferred. An equivalent form for this estimate is to calculate the Gauss-Newton estimate directly from equation (8) for each update time k. Given an existing estimate $\hat{x}^p_k$ at time k, the estimate can be refined by calculating $\Delta x$ such that $$\hat{x}_k^{p+1}=\hat{x}_k^p+\Delta x, \quad (10)$$

where $\Delta x$ is found by solving the linear equation:

$$P_k^{-1}\Delta x=g \quad (11)$$

The values $P_k$ and g are found using:

$$P_k^{-1}=P_{x,k|k-1}^{-1}+\nabla h^T R_y^{-1} \nabla h, \quad (12)$$

and $$g=P_{x,k|k-1}^{-1}(x-\hat{x}_{k|k-1})+\nabla h^T R_y^{-1}(y-h(x)). \quad (13)$$

These equations can be iterated until a tolerance is met, or until no more improvement in the estimate occurs. The initial value for x is chosen to be the previous estimate $\hat{x}_{k|k-1}=\hat{x}_{k-1}$, and $P_{x,k|k-1}=P_{x,k-1}$ is used. At time k=1, the previous estimate $\hat{x}_{1|0}$ can be chosen to be the beam center and $P_{x,1|0}=P_{x,0}$ can be chosen to have the radius of the beam center be one standard deviation. In situations that the satellite motion is to be tracked, i.e., when a position determination is calculated over a relatively long time period, then $\hat{x}_{k|k-1}$ and $P_{x,k|k-1}$ can be generated using the appropriate satellite motion models. It should also be noted that output covariance, $P_{x,k-1}$, only needs to be generated (thereby saving an inversion operation) when it is desired to monitor convergence of the output result.

In each iteration the gradient $\nabla h=\nabla_x h(x)$ is calculated at the point of the current estimate $\hat{x}_k^p$. This is given by:

$$\nabla_x h(x) = \begin{bmatrix} \nabla_x h_1(x) \\ \nabla_x h_2(x) \\ \vdots \\ \nabla_x h_6(x) \end{bmatrix}, \quad (14)$$

where the values of $\nabla_x h_i(x)$, i=1,2, . . . ,6 are given by:

$$\nabla_x h_i(x) = \begin{bmatrix} \delta h_i / \delta x \\ \delta h_i / \delta y \end{bmatrix} \quad (15)$$

$$= -2\alpha e^{-\alpha\left((x-x_i)^2+(y-y_i)^2-(x-x_0)^2+(y-y_0)^2\right)} \begin{bmatrix} (x-x_i)-(x-x_0) \\ (y-y_i)-(y-y_0) \end{bmatrix} \quad (16)$$

$$= -2\alpha(x_i - x_0)e^{-\alpha\left(|x-x_i|^2-|x-x_0|^2\right)}. \quad (17)$$

Using these model equations, the mobile position can now be determined using, e.g., equation (8) along with measurements of received beams' signal strength and the modeled beam pattern.

Exemplary simulations have been performed to evaluate the present invention. In these examples, the performance in an all-white Gaussian noise (AWGN) channel was investigated, and it is expected that this will give a bound on performance, as compared to the performance in a Rician or Rayleigh faded channel. The simulations were performed for QPSK signaling in an AWGN channel, and include the effects of pulse shaping and IF filters. A block diagram illustrating the simulations is shown in FIG. 5.

Figure 5:
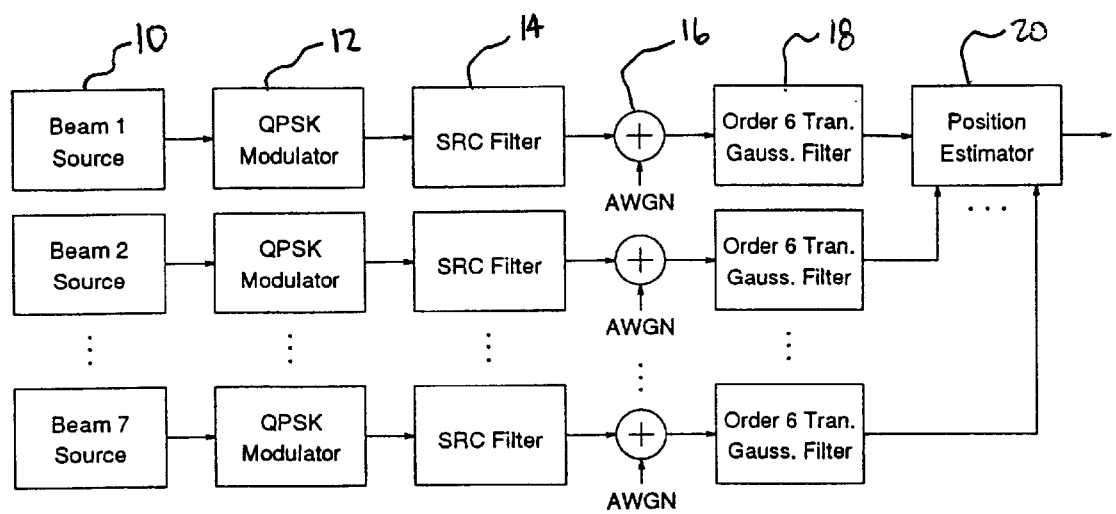
FIG. 5 is a block diagram illustrating the model used to simulate an exemplary embodiment of the present invention.
Figure 6:
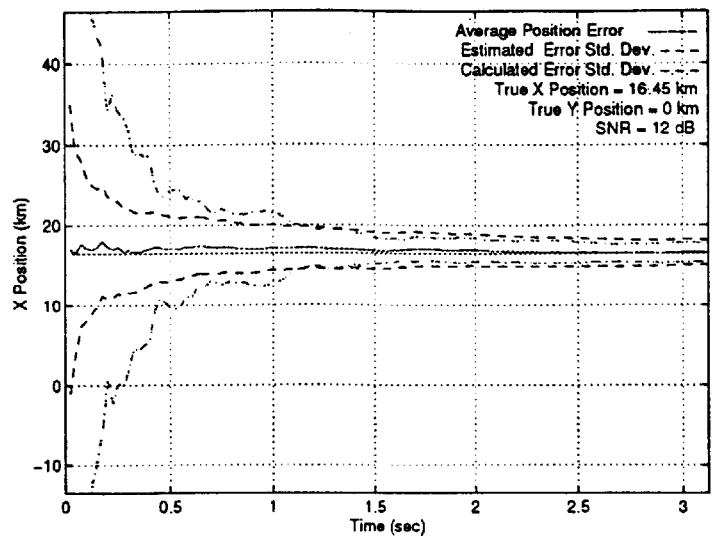
FIG. 6 is a plot of X coordinate estimation versus elapsed time of the simulation.
Figure 7:
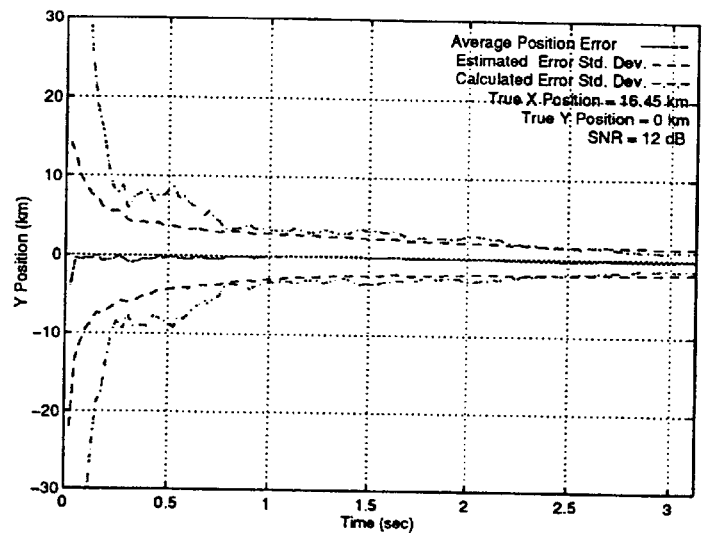
FIG. 7 is a plot of Y coordinate estimation versus elapsed time of the simulation.

In FIG. 5, the block diagram illustrates that a parallel configuration was employed for the simulation wherein signals from each of seven beams were simultaneously processed by a position estimator. Of course, those skilled in the art will understand that a serial implementation can be implemented wherein a single receiver successively processes signals from each of the seven beams. For example, in a TDMA system employing a frame structure having N slots, a mobile station connected to the system using one of N slots could use its idle time to process signal strength measurements according to the present invention.

The following simulation results are based upon the model shown in FIG. 5 wherein a beam source 10 for each beam produces a composite signal which is QPSK modulated at block 12. The modulated signal is then processed through blocks 14, 16 and 18 to model the effects of the channel on that signal. The position estimator 20 receives the signal and measures the received signal strengths to calculate position as described above.

In these simulations it is assumed that the power measurements for the different satellite beams are received within the same frame, and that receiving the power measurements at different times within the frame does not require tracking of the satellite or channel. Simulations were run for a user from the center of the beam to the crossover point to the adjacent beam. This corresponds to a range of 150 kilometers for the center beam. FIG. 6 through FIG. 9 show the averaged results for a set of 20 different simulation runs for one exemplary mobile position and SNR value.

Figure 8:
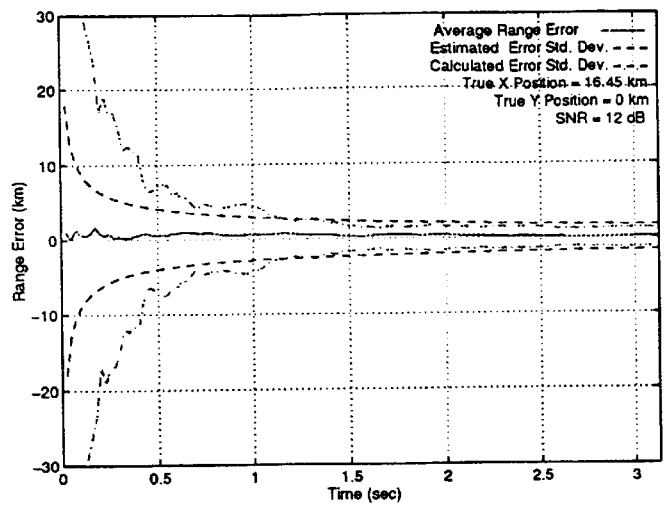
FIG. 8 is a plot of estimated range versus elapsed time of the simulation.
Figure 9:
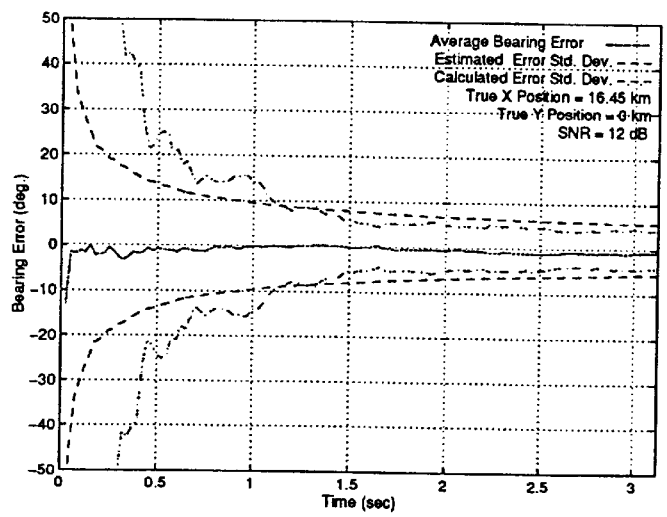
FIG. 9 is a plot of estimated bearing versus elapsed simulation time.

These figures show the average X and Y position and standard deviation curves as a function of time, (i.e., FIGS. 6–7, respectively) as well as the corresponding range and bearing estimates from the center of the beam (i.e., FIGS. 8–9, respectively. The estimated standard deviation curves are generated from the Kalman algorithm, while the calculated standard deviation curves are generated as a result of the Monte-Carlo simulation runs, and are found to be in agreement for this simulation case. The Monte-Carlo simulation runs provided a series of simulations with different noise values. The results are then averaged to give the expected value of the technique. This result shows that for a user close to the beam center, with a relatively high signal to noise ratio, the estimated user position can be localized to within a few kilometers within the simulation time. In this exemplary simulation, it took from two to three seconds to reduce the certainty of the result to three kilometers.

The following exemplary slot/frame format design parameters were used in a simulation, and power measurements were generated by calculating the average power in the slot corresponding to each beam. The noise in the power measurement was set to be a value of 0.5 (after filtering), and this was chosen to be the worst-case noise variance corresponding to a received signal/noise ratio of 2 dB.

| Parameters | Exemplary Simulation Values |
| --- | --- |
| # of antenna array beams | 211 |
| Center beam radius | 150 km |
| Reuse frequency | 7/1 |
| Exponential model α value | 0.1891 |
| Satellite orbit | Intermediate circular orbit 10360 km |
| Signal/Noise ratio | 2 dB |
| Frame length | 1.25 ms |
| Channel bandwidth | 200 kHz |

Figure 10:
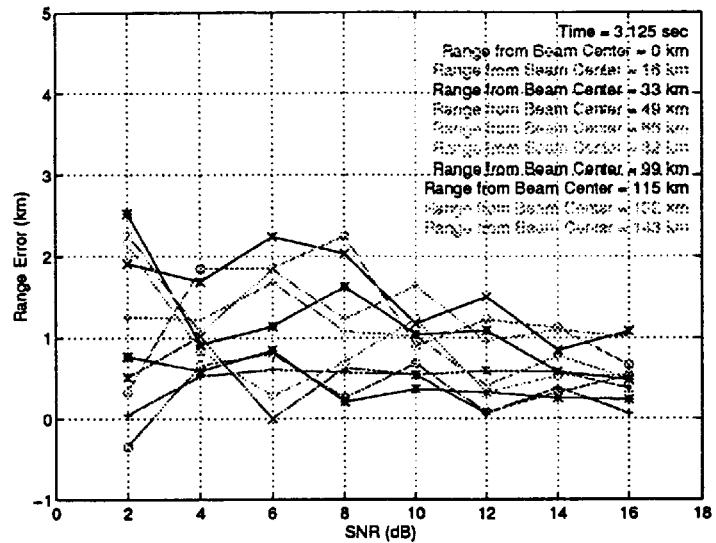
FIG. 10 is a plot of estimated range error versus signal-to-noise ratio.
Figure 11:
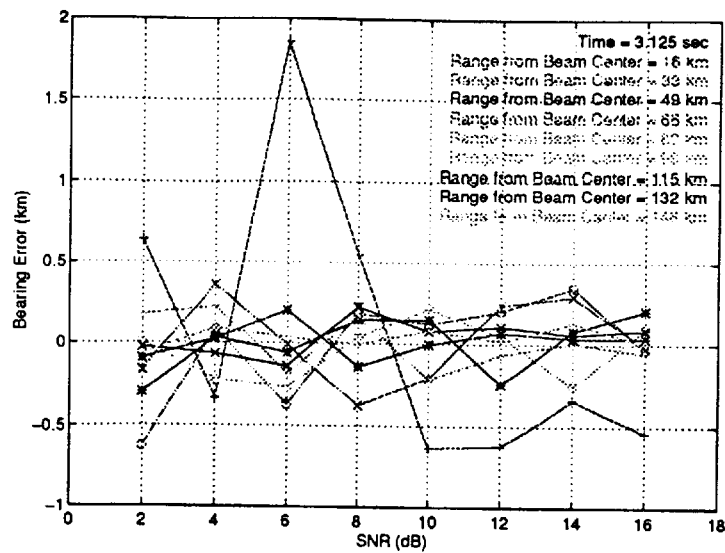
FIGS. 11–17 show plots of other simulation characteristics.
Figure 12:
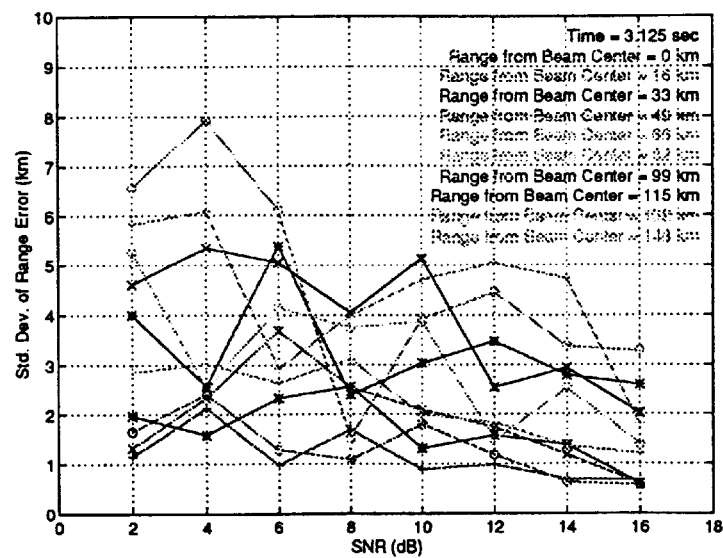
Figure 13:
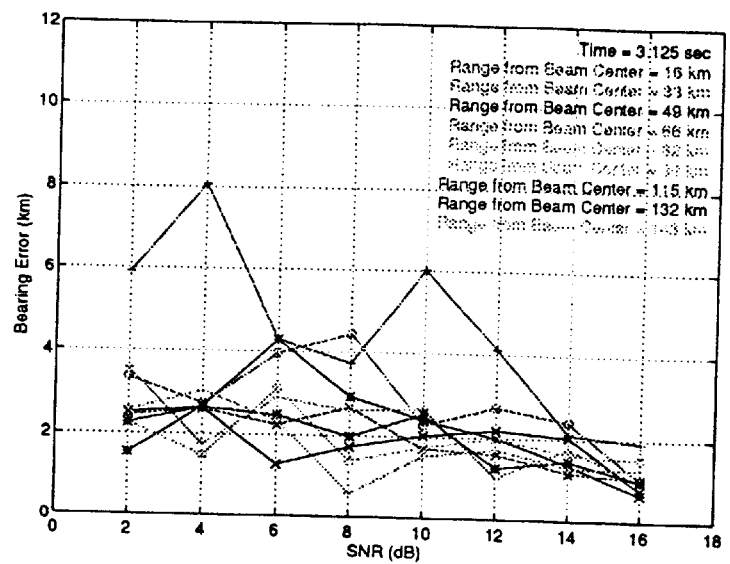

FIG. 10 and FIG. 11 show the average range and bearing estimates as a function of the SNR. Each plot includes curves for different mobiles positioned from the beam center. The range error lot also shows that there may possibly be a bias in the range estimate, although more Monte-Carlo runs are required to confirm this suspicion. In any case, the bias is small and most likely due to the fact that the noise in the power measurements is not Gaussian. The bearing error estimates are shown to be accurate within a degree, except when the range of the mobile is close to the beam center (where the range estimate is more accurate). FIG. 12 and FIG. 13 show the calculated standard deviation of the range and bearing estimates, respectively, as a function of the received SNR. These plots show the estimates are most accurate for high SNR values. In particular, the range estimates are most accurate for high SNR, although at distances close to the beam center the range estimate is accurate even in low SNR cases. The bearing error is most accurate for long range or high SNR cases.

Figure 14:
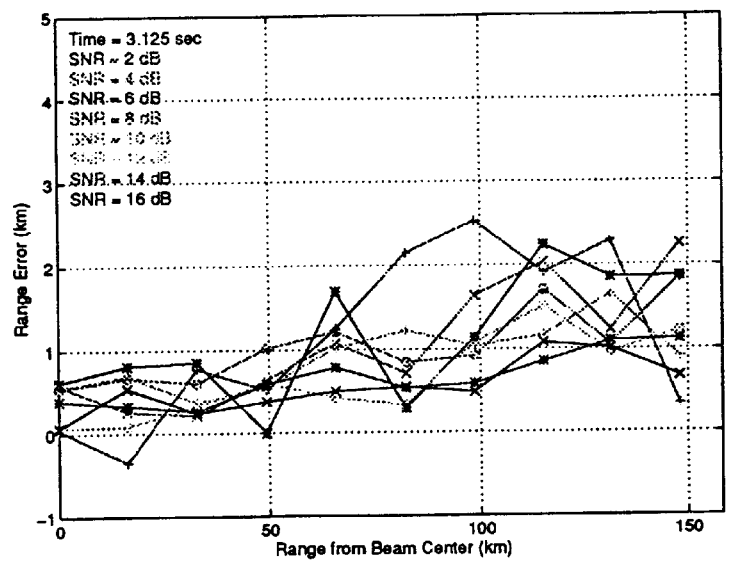
Figure 15:
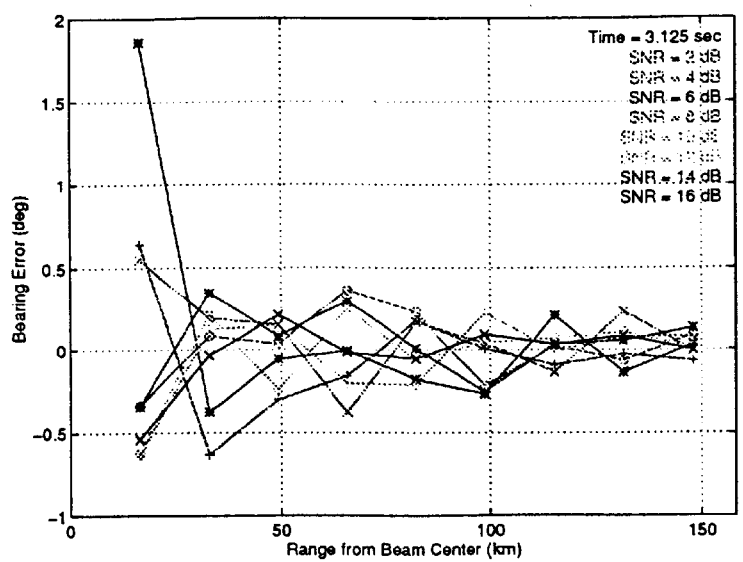
Figure 16:
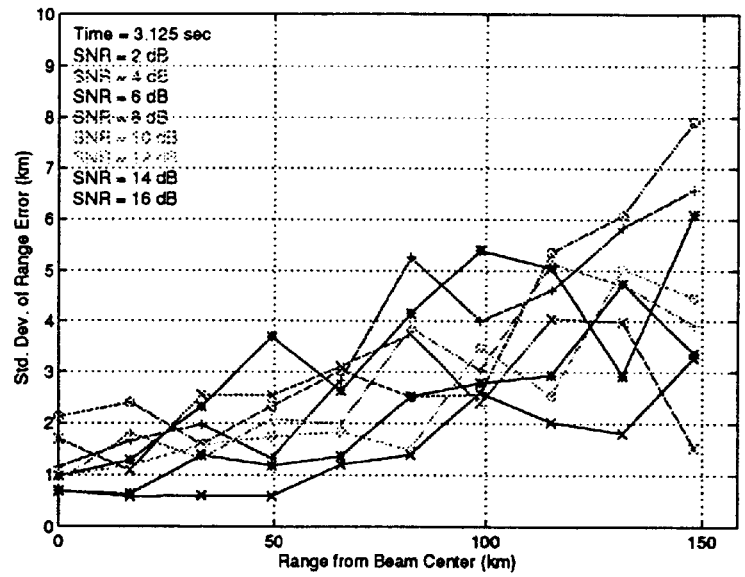
Figure 17:
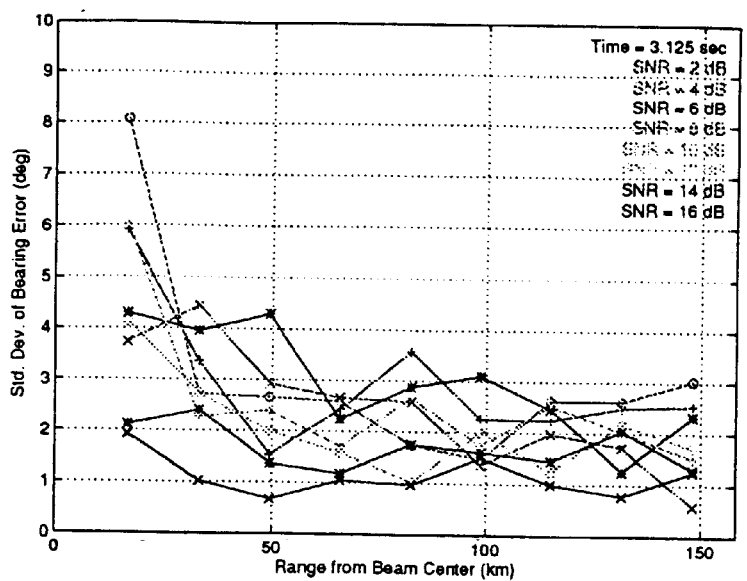

FIG. 14 and FIG. 15 show the average range and bearing estimates as a function of the range from the beam center. Each plot includes curves for different SNR values, and shows that the range accuracy increases with shorter range values, while bearing accuracy increases with longer range values. FIG. 16 and FIG. 17 show the calculated standard deviation of the range and bearing estimates, respectively. FIG. 16 indicates that the bias in the resulting range error is a function of range.

Figure 18A:
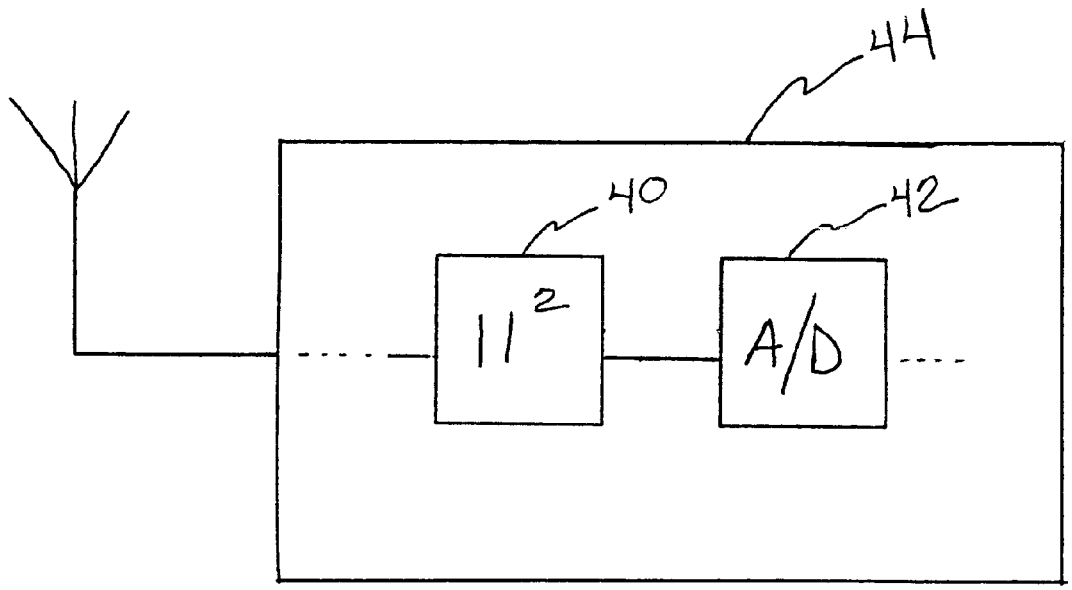
FIGS. 18(*a*) and 18(*b*) depict exemplary power measurement devices.
Figure 18B:
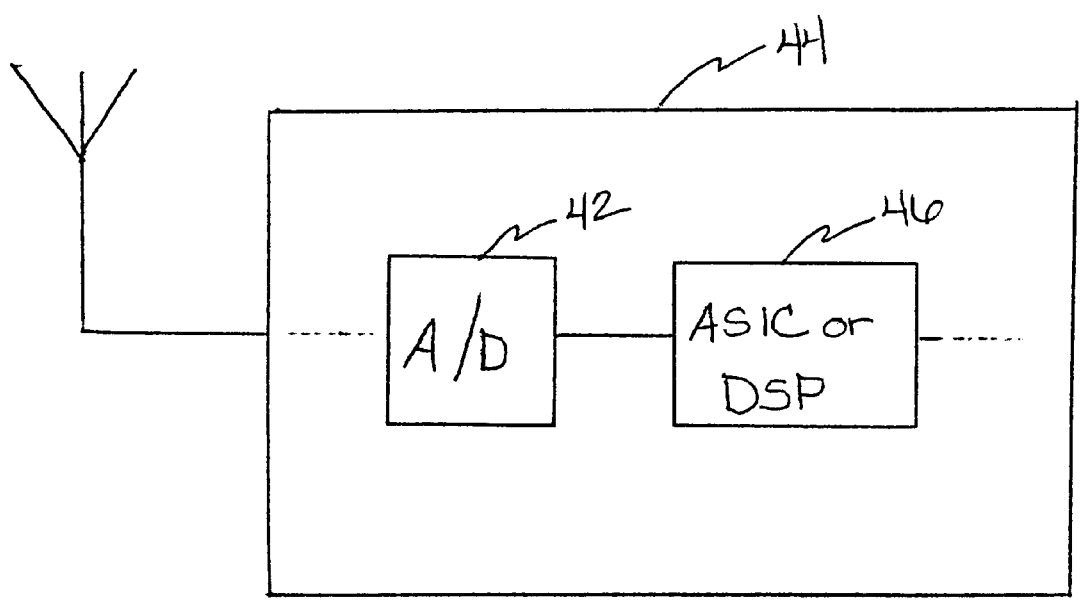
Figure 19:
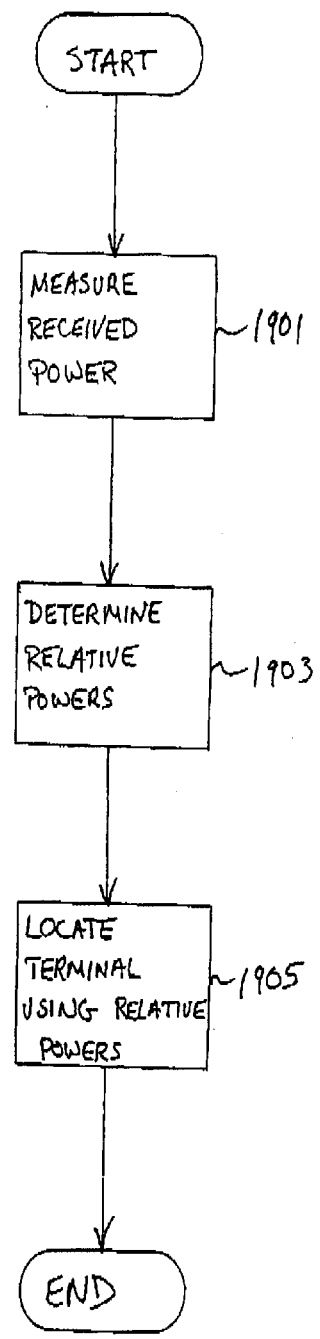
FIG. 19 is a flowchart summarizing methods of locating terminals according to the present invention.

Measurement of received signal strength per se is generally well known in the art of radiocommunication. Accordingly, conventional or other types of power measurement devices can be incorporated into terminals to make measurements on nearby spot beams, which measurements can then be used as input to the afore-described exemplary location algorithm. For example, as shown in FIG. 18(a), an analog square-law power measuring device 40 could be placed upstream of an A/D converter 42 in the received signal processing path of a terminal 44. Alternatively, as shown in FIG. 18(*b*), power measurement could be performed in an ASIC or DSP 46 downstream of the A/D converter 42. Moreover, a plurality of measurements can be taken and an average value, e.g., computed by averaging filter, presented to the location algorithm. The location algorithm can be processed either in the mobile station or in any other part of the system, e.g., base station, satellite, etc. If processing is desired in other than the mobile station, the row measurement results may be transmitted via an uplink channel to the base station or satellite. Alternatively, the base station or satellite can also be involved in performing the measurements. FIG. 19 is a flowchart summarizing the afore described terminal location techniques. At step 1901, the received power of the terminal is measured in different spot beams. At step 1903, the measured powers are compared to a reference to determine relative powers. These relative powers are then used to locate the terminal at step 1905.

It will be appreciated by those skilled in the art that the present invention can be embodied in other specific forms without departing from the spirit or essential character thereof. The presently disclosed embodiments are therefore considered in all respects to be illustrative and not restrictive. For example, although exemplary embodiments describe position location of terminals in the beam pointing at nadir, those skilled in the art will appreciate that the present invention can also be applied to terminals in other beams. Moreover, although the exemplary embodiments have been described in terms of satellite radiocommunication systems, those skilled in the art will appreciate that position determination according to the present invention can be implemented in other types of systems. For example, land-based systems in which base stations are provided with arrays that illuminate various areas could also implement the present invention. The scope of the invention is indicated by the appended claims rather than the foregoing description and all changes which come within the meaning and range of equivalents thereof are intended to be embraced therein.

What is claimed is:

1. A method for estimating a position of a terminal in a radiocommunication system using an array to illuminate areas with spot beams, comprising the steps of:

measuring a received power associated with each of a plurality of said spot beams;

determining relative powers associated with said received power by comparing said measured received powers with a reference power; and estimating said position of said terminal using said relative powers and a model of spot beam shape.

2. The method of claim 1, wherein said step of measuring is performed at said terminal.

3. The method of claim 1, wherein said step of measuring is performed at one of a base station and a satellite.

4. The method of claim 2, wherein said reference power is a power received by said terminal of a spot beam which illuminates a geographical region in which said terminal is currently located.

5. The method of claim 1, wherein said steps of determining and estimating are performed in said terminal.

6. The method of claim 1, wherein said steps of determining and estimating are performed in one of a base station and a satellite.

7. The method of claim 1, wherein said model is an exponential model.

8. The method of claim 1, wherein said step of locating further comprises the step of:

repeatedly evaluating the following equation:

$$J(x)=(x-\hat{x}_{k|k-1})^T P_{x,k|k-1}^{-1}(x-\hat{x}_{k|k-1})+(y-h(x))^T R_y^{-1}(y-h(x)).$$

9. A method for accessing a radiocommunication system comprising the steps of:

measuring a received power associated with each of a plurality of said spot beams;

determining relative powers associated with said received power by comparing said measured received powers with a reference power;

locating said terminal using said relative powers and a model of spot beam shape;

using said location of said terminal to determine a Doppler compensation; and accessing said radiocommunication system using said Doppler compensation.

10. The method of claim 9, wherein said step of measuring is performed at said terminal.

11. The method of claim 9, wherein said step of measuring is performed at one of a base station and a satellite.

12. The method of claim 9, wherein said reference power is a power received by said terminal of a spot beam which illuminates a geographical region in which said terminal is currently located.

13. The method of claim 9, wherein said model is an exponential model.

14. The method of claim 9, wherein said step of locating further comprises the step of:

repeatedly evaluating the following equation:

$$J(x)=(x-\hat{x}_{k|k-1})^T P_{x,k|k-1}^{-1}(x-\hat{x}_{k|k-1})+(y-h(x))^T R_y^{-1}(y-h(x)).$$

15. A method for handing over a connection in a system using an array to provide radiocommunication coverage to areas using spot beams, comprising the steps of:

measuring a received power associated with each of a plurality of said spot beams;

determining relative powers associated with said received power by comparing said measured, received powers with a reference power;

locating said terminal's position using said relative powers and a model of spot beam shape; and handing over said connection from a first spot beam to a second spot beam based on said terminal's position.

16. The method of claim 15, wherein said reference power is a power received by said terminal of said first spot beam which illuminates a geographical region in which said terminal is currently located.

17. The method of claim 15, wherein said reference power is a power transmitted by said terminal of and received in a first spot beam of an array antenna which illuminates a geographical region in which said terminal is currently located when said array antenna is being used to transmit.

18. The method of claim 17, wherein said model is an exponential model.

19. The method of claim 15, wherein said step of locating further comprises the step of:

repeatedly evaluating the following equation:

$$J(x)=(x-\hat{x}_{k|k-1})^T P_{x,k|k-1} (x-\hat{x}_{k|k-1})+(y-h(x))^T R_y^{-1}(y-h(x)).$$

20. The method of claim 1, wherein said step of measuring further comprises the step of:

measuring each received power simultaneously.

21. The method of claim 1, wherein said step of measuring further comprises the step of:

measuring each received power in each of said plurality of spot beams on a different frequency.

22. The method of claim 1, wherein said step of measuring further comprises the step of:

measuring each received power at different times and adjusting the measured power taking into account movement of a satellite including said array.

23. The method of claim 9, wherein said step of measuring further comprises the step of:

measuring each received power simultaneously.

24. The method of claim 9, wherein said step of measuring further comprises the step of:

measuring each received power in each of said plurality of spot beams on a different frequency.

25. The method of claim 10, wherein said step of measuring further comprises the step of:

measuring each received power at different times and adjusting the measured power taking into account movement of a satellite including said array.

26. The method of claim 15, wherein said step of measuring further comprises the step of:

measuring each received power simultaneously.

27. The method of claim 15, wherein said step of measuring further comprises the step of:

measuring each received power in each of said plurality of spot beams on a different frequency.

28. The method of claim 16, wherein said step of measuring further comprises the step of:

measuring each received power at different times and adjusting the measured power taking into account movement of a satellite including said array.

* * * * *

UNITED STATES PATENT AND TRADEMARK OFFICE
CERTIFICATE OF CORRECTION

PATENT NO. : 6,684,071 B1
DATED : January 27, 2004
INVENTOR(S) : Molnar et al.

It is certified that error appears in the above-identified patent and that said Letters Patent is hereby corrected as shown below:

The drawing sheet consisting of fig. 19 should be deleted and substitute therefore the attached drawing sheet.

Column 10,
Line 12, should read -- power by comparing said measure, received powers --

Signed and Sealed this

Twenty-seventh Day of July, 2004

JON W. DUDAS
*Acting Director of the United States Patent and Trademark Office*